United States Patent
Tsutsumi

[11] 3,800,027
[45] Mar. 26, 1974

[54] INJECTION MOLDING APPARATUS FOR SYNTHETIC RESIN

[76] Inventor: Shigeru Tsutsumi, 1165 Toyama-machi, Yamagata-ken, Yonezawa, Japan

[22] Filed: Feb. 8, 1972

[21] Appl. No.: 224,547

[30] Foreign Application Priority Data
Feb. 17, 1971  Japan.............................. 46-6900

[52] U.S. Cl............................... 425/243, 425/160
[51] Int. Cl............................................... B29f 3/08
[58] Field of Search ...... 249/105, 78; 164/304, 305, 164/311; 425/247, 135, 160, 243; 264/328, 329

[56] References Cited
UNITED STATES PATENTS

| | | | |
|---|---|---|---|
| 3,077,636 | 2/1963 | Peters | 425/247 X |
| 3,165,570 | 1/1965 | Deutsch | 264/329 |
| 3,010,155 | 11/1961 | Gilmore | 264/329 |
| 2,617,152 | 11/1952 | Rubin | 264/329 X |
| 3,103,039 | 9/1963 | Robinson | 425/247 |
| 2,411,971 | 12/1946 | MacMillin | 425/135 |
| 2,834,992 | 5/1958 | Jupa | 264/329 X |

Primary Examiner—J. Spencer Overholser
Assistant Examiner—John S. Brown
Attorney, Agent, or Firm—Michael S. Striker

[57] ABSTRACT

The present disclosure relates to an apparatus for injection molding of synthetic resin without forming sprue waste. The structure is improved so as not to form sprue waste in a sprue and runner of a mold by providing a heater to heat intermittently for fusing the synthetic resin solidified in the sprue gate, being arranged in the runner and its pointed wire extended from the heater being introduced in the gate opening.

5 Claims, 8 Drawing Figures

INJECTION MOLDING APPARATUS FOR SYNTHETIC RESIN

BACKGROUND OF THE INVENTION

Generally, in such a kind of injection molding apparatus, when a molding process is carried out, fused synthetic resin is poured into a runner from which it is injected through a gate or sprue into a metal mold which has one or more cavity or cavities and then, it is cooled to solidify for forming a product which is released from the metal mold and a solidified waste piece or sprue waste which is formed both in the gate and the runner should be removed without fail for a necessary sequent molding process.

Thus, these steps are repeated so constantly for molding products that it may be understood that the design of the metal mold, including the sprue or gate and the runner, will have much effect on the quality of products and on efficiency progress and that it is very troublesome to take out the sprue waste solidified every time by cooling the product and that for producing products of good quality it is necessary to consume much resin for sprue waste, sometimes much more material rather than for the products. In another apparatus employing injection molding method known as a "Hot Sprue" or "Sprueless Method," have been eliminated those faults as above mentioned by keeping the material from being solidified by cooling, using a heater for heating constantly the sprue and the portion forming the runner, but it is noted that there are still some faults in its results because the constant heating by the above mentioned method, not only gives the products to be cooled and solidified a bad effect, but also necessitates a big amount of heating source making the loss larger, without being worth the name of "Sprueless Method," wherein a screw or plunger for plunging material into the mold is provided which returns after finishing its plunging movement to its normal position accompanying with extraneous material flown back from the mold cavity through the hot gate in which the material is fused constantly, so that the shape of the products becomes distorted with concavities or uneveness getting poor results of producing only low-grade castings, especially, in case the material is such poly-amid resin as nylon, molding is impossible owing to threading of fused material. Thus, the improvement in precise molding with high accuracy is impossible to carry out by the method as above mentioned.

DETAILED DESCRIPTION

It is a main object of the present invention to provide an effective, productive method and apparatus of injection molding for synthetic resin by which to eliminate the faults in the above mentioned method and apparatus wherein a successive molding process is possible by the method in which the resin being kept fused both in the runner and the gate which is formed in front of the runner, is solidified by cooling so that the gate may be shut every time after an injection molding process has finished, while to open the gate the resin blocked therein, is heated partially to be fused instantly again before a sequent injection molding process is to be carried out, thus, the successive molding work is possible with a high efficiencial process for an injection mold carried out by the above mentioned method and apparatus.

It is another object of the present invention to provide an effective, productive method and apparatus of injection molding for synthetic resin by which, it is possible to produce castings of intricate shape of synthetic resin with high accuracy, because the gate is blocked by solidified resin every time after an injection molding process without being fused constantly by a heater like the conventional "Sprueless Method," since the cooled and solidified resin blocking the gate, is possible to be fused rapidly by being heated instantly every time for a sequent injection molding process in the present invention.

It is another object of the present invention to provide an effective, production method and apparatus of injection molding for synthetic resin wherein by solidifying the resin partially in the very narrow gate opening communicated with the cavity of the mold, the fused resin injected into the cavity is prevented from flowing back into the runner, so that sniveling or threading of fused resin or the loss caused by flowing back of resin is eliminated, and the durability of such a damageable metal mold which is separable and combinatable, will be so much increased that it makes possible to produce evenly the products having excellent surface and to save the time to rest the mold to be put in order, wherefore an automatic process without employing any hands, is possible to carry out.

It is a further object of the present invention to provide an effective, productive method and apparatus of injection molding for synthetic resin wherein a pointed heater having a diameter smaller than the caliber of the gate opening which is communicated with the mold cavity, is extended in the gate opening and is energized every time of an injection molding process to heat and fuse the resin which is solidified by cooling and blocked in the gate, for opening the gate.

It is still another object of the present invention to provide an effective, productive method and apparatus of injection molding for synthetic resin, wherein the heater for heating intermittently, is fixed to the front end portion (left side of FIG. 2, etc.) of a tubular member which is arranged in the runner in the rear of the gate, and is operated in a predetermined time set by a timer mechanism every time of an injection molding process to heat the gate and runner and fuse the resin solidified by being cooled, for opening the gate.

It is still a further object of the present invention to provide an effective, productive method and apparatus of injection molding for synthetic resin, wherein a mold is provided with a plurality of mold cavities each of which having a gate, in the opening of which is extended a point of a heater to desired position therein, to be generated heat every time of an injection molding process to fuse the resin which is solidified by being cooled and blocked in each gate for a sequent injection molding process that forms no sprue waste.

It is still another object of the present invention to provide an effective, productive method and apparatus of injection molding for synthetic resin, wherein a very large mold cavity in a mold is provided with a plurality of gates, in each opening thereof being extended a point of a heater to be generated heat every time of an injection molding process to fuse the resin which is solidified by being cooled and blocked in each gate, for an injection molding process that forms no sprue waste.

Other objects and advantages of the invention will become apparent from the following detailed description taken in connection with the accompanying drawings, in which.

Figure 3A:
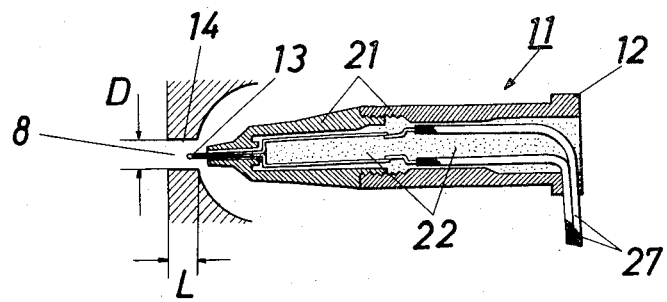
FIG. 3a is a vertical sectional side view illustrating the position of an intermittent heater showing its inner structure.
Figure 4A:
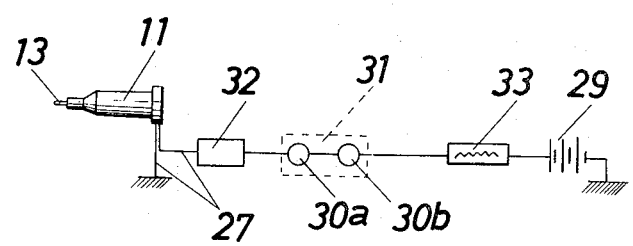
FIG. 4a is a block diagram of the heater in FIG. 3a showing a heating method.
Figure 4B:
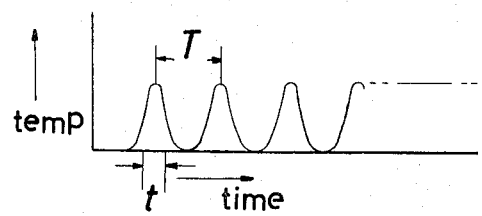

FIG. 4b discloses a curve of time to temperature for the heater in FIG. 3a.

Figure 5:
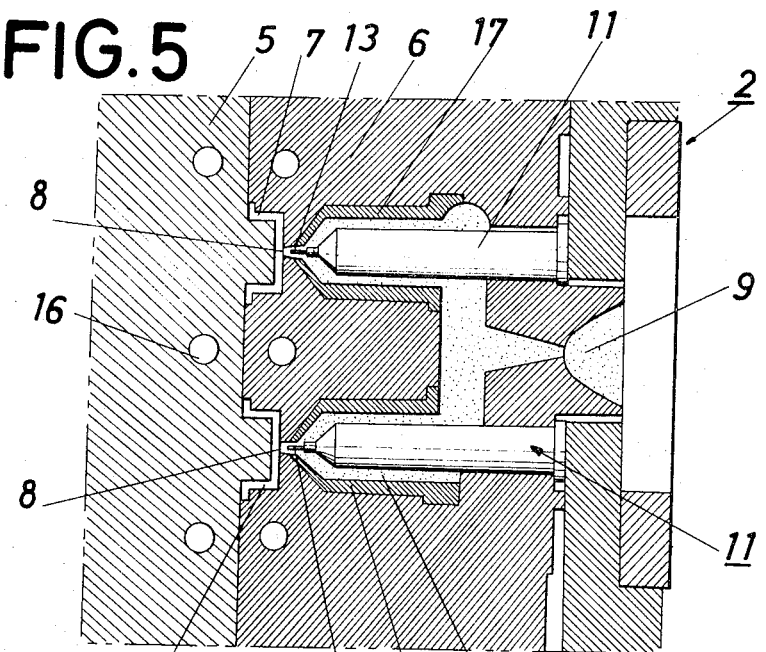

FIG. 5 is a vertical sectional side view of an elemental portion of a structure of another embodiment of a metal mold having a plurality of mold cavities and gates.

Figure 6:
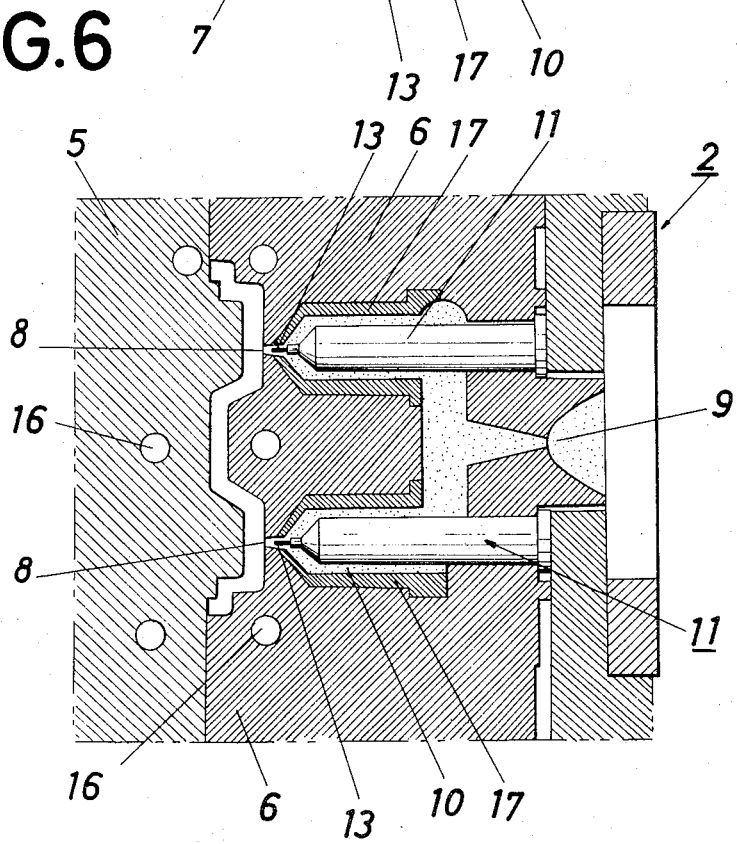

FIG. 6 is a vertical sectional side view of an elemental portion of a structure of still another embodiment of a metal mold having a mold cavity with a plurality of gates.

Now the structure and the method according to an embodiment of the present invention will be described in detail referring to FIGS. 1 and 2.

In the drawings, the numeral 1 denotes a bed on which an injection system 2 and a mold-operating system 3 are mounted. In the injection system 2, the material of synthetic resin supplied through a hopper 4 is fused and controlled to be prepared previously for each intermittent emission by the amount corresponding to the size of a product. The mold operating system 3 having a conventional structure is operated in connection with an injection molding process so as to cast a desired product continuously. A mold is consisted of a male part 5 and a female part 6 having an injection gate 8. Between a nozzle 9 of the emitting system 2 and the injection gate 8 is formed a runner 10 in which an intermittent heater 11 as a heating source is supported at the bottom 12 thereof, a pointed wire 13 for generating heat of the heater 11 is introduced into an opening surrounded by a gate land 14 which forms the gate 8, the diameter of which is preferred to be about 1 mm, for example, so as to be introduced the pointed wire 13 having a less diameter than 1 mm, into the opening of the gate land 14.

A metal block 15 having a runner 10 formed therein, is connected to a device (not shown in the drawings) for keeping the resin warm that is held in the runner 10 to be injected.

In both male part 5 and the female part 6 of the mold are formed a plurality of passages 16 for flowing cooling water. On the opposite side of the cavity of the female part 6 is provided with a conical cap 17 screwed into the inner surface of the metal block which is provided with or without an adiabatic layer of air between the cap and the female part, the pointed portion of the cap 17 is preferably conformed to the outer opening of the injector gate 8.

Figure 1:
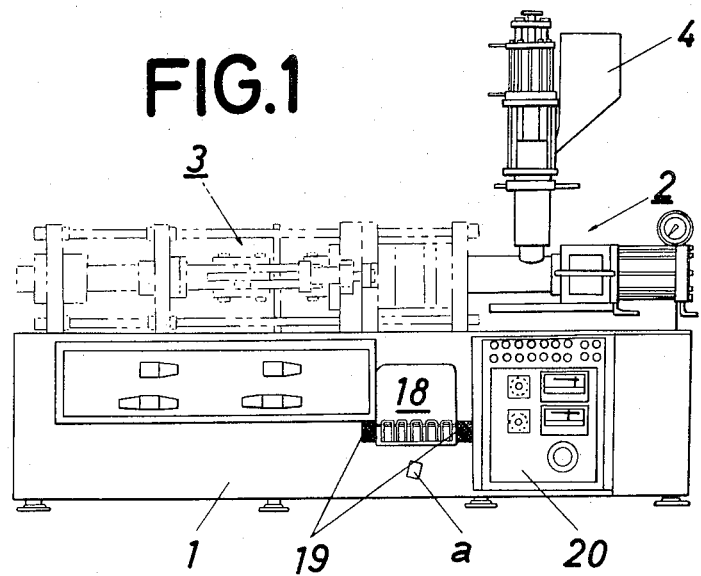
FIG. 1 is a side view of skeletonized whole structure of an embodiment of the apparatus of injection molding for synthetic resin in accordance with the present invention.
Figure 2:
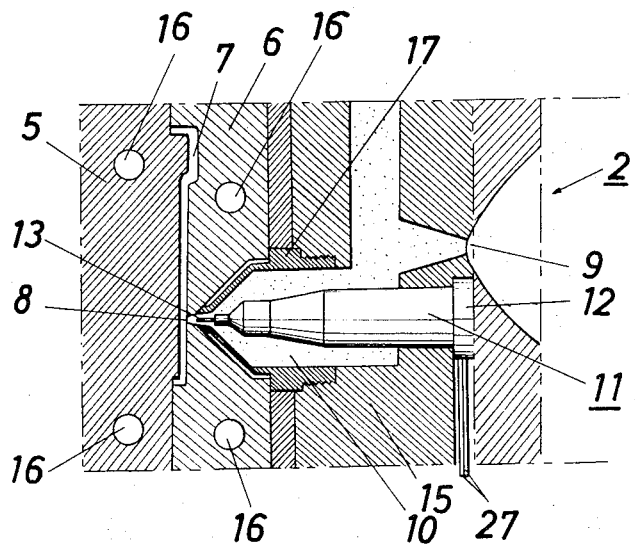
FIG. 2 is an enlarged vertical sectional side view of an elemental portion of a metal mold in the embodiment of the apparatus in FIG. 1.

In FIG. 1, the numeral 18 denotes an outlet of the released molded products, the numeral 19 denotes an electrical inspecting and counting system of the products passing the outlet for automatically sending a starting signal for a subsequent injection process, and the numeral 20 denotes a controlling box where various electric control and an air-compressor control are operated.

According to the above described structure of the present embodiment, the operation or process thereof will be explained as follows:

The material of synthetic resin as desired, is supplied through the hopper 4 into the synthetic-resin-injecting system 2 wherein the material of resin is completely fused for injection, receiving a signal through the operation of the controlling box 20, which sends signals to each system for making preparation to start.

Under the satisfied conditions that every part of the injection system 2 is heated at a desired temperature and that the cooling water starts to flow through cooling-water-passages 16, 16 formed both in the male part 5 and female part 6 of a mold, the intermittent heater 11 can be electrically energized for a certain time.

Then, the solidified resin in the gate 8 is heated to be fused and combined with the fused resin in the runner 10 through the gate 8, which is opened by the heating process of the intermittent heater 11 and at the same time, the mold-operating system 3 is actuated to proceed either of the parts of the metal mold 5 or 6 against the other part which is fixed unmovably, until the both parts of the mold contact with each other, then the synthetic-resin-injection system starts to operate so that an injection molding process is carried out like a conventional injection molding process. After having finished the injection process, the intermittent heater 11 is disenergized to stop heating, so that the fused resin in the opening of the gate 8 which is narrow and radiative, becomes solidified instantly to block the gate 8. Then, the mold-operation system 3 is opened, namely, two parts of the mold are torn apart, to release and drop a product on the outlet 18 to be taken out. Thus, an injection molding process is completed so as to repeat automatically and continuously. In brief, in the above mentioned embodiment when such temperatures of the injection system and of cooling water in the mold parts 5, 6 and of the runner have become to the satisfied condition for molding continuously and automatically, the intermittent heater 11 is, firstly, electrically activated to heat for a certain time, before the injection process begins, for fusing the solidified resin in the gate 8 to be opened. Then the mold-operating system 3 begins to move either of the parts 5 or 6 of the metal mold, both parts of which were spaced each other, to clamp with the other part which is fixed immovably, and then the emitting system 2 is possible to emit a desired amount of resin. After the injection molding process, the mold operating system 3 operates to open the mold. By opening the mold the product is released to the outlet to be taken out. Thus, every time after an injection molding process, the gate is blocked instantly by solidified resin by which the fused resin injected into the mold cavity 7 is prevented from flowing back to the runner 10 and prevented from forming uneveness on castings, thus the casting having high accuracy can be produced. The solidified resin in the opening of the gate 8 can be easily fused again by the intermittent heater 11 so as to open the gate 8 and combine the fused resin with the constantly fused resin in the runner 10, so that the number of cycle of molding process can be increased as well as the conventional, so called "Sprueless Method" which has an advantage of the rapid cycle saving waste of the material without forming any solidified extraneous material or sprue waste.

As above mentioned, in this embodiment such steps as heating process by the intermittent heater 11, clamping and opening of a mold by the mold by the mold operating system 3, injection process and a process of releasing and taking out of products, are serially proceeded in regular order continuously, so that an automatic operation in every system is possible, and especially a safety-brake can be arranged in the mold-operating system 3 so as to check any malfunction the machine and to send an alarm signal for stopping the operation thereof, thus, the machine is secured itself against excessive, compulsory use and against a big damage.

The mold-operating system 3 in the above mentioned embodiment, is not limited in its structure or operation, so, if it can operate smoothly in connection with the intermittent heater 11 and can actuate the mold-operating system to clamp and tear apart the parts of the mold, it may be of any construction.

Now, the structure and operation of the intermittent heater 11 will be explained in detail in connection with FIGS. 3a, 3b, 4a and 4b. In FIG. 3a, the intermittent heater 11 is provided with a metal tubular shell 21 therearound, in tapered shape, having a diameter in section gradually diminishing toward its front end, and at the front end portion of the heater 11 such a heat-generating wire 13 as nichrome wire bent in the shell 21, is extended in the opening surrounded by the gate land 14 of the gate 8, being supported firmly so that the other end portion may be fixed to and in such ceramic material as baked clay 22 which is filled and solidified in the shell 21 durably, but every time of an injection molding process, the heat-generating wire 13 of the intermittent heater 11, after a long use, is apt to be pushed back rearwardly owing to the reaction of injection of which pressure acts upon the gate 8 similarly to the wire 13, namely, when the fused resin is injected through the gate 8, the heat-generating wire 13 tends to be pulled off from the metal tubular shell 21 with the forward action toward the gate, while as soon as the mold cavity 7 is filled with resin, the air pressed therein is forced to flow towards a passage of leading wires 27 through a narrow gap between the metal tubular shell 21 and the heat-generating wire 13, so that after having repeated the process of injection, the heat-generating wire 13 is apt to be retreated being deformed leading to damage thereof, or the resin tends to leak out through the passage of the leading wires 27.

However, as the base of the heat-generating wire 13 is supported firmly being fixed to the baked ceramic clay in the metal tubular shell 21, deformation and damage of the wire 13 and leakage of resin will not occur, and also non-conductibility, the factor of safety and durability are excellent. The embodiment in FIG. 3a is characterized by the above mentioned structure, operation and effect.

Figure 3B:
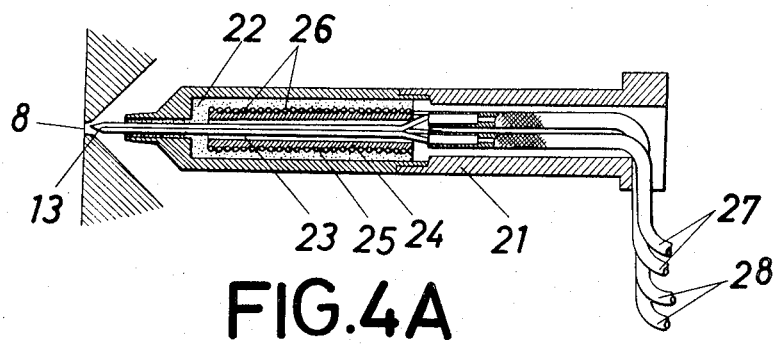
FIG. 3b is a vertical sectional side view illustrating another embodiment of an intermittent heater.

In FIG. 3b, a comparatively long metal tubular shell 21 is formed having a similar diameter from its top to the bottom and having a conical portion at the top and provided with such the heat-generating wire 13 as nichrome wire projected into a conical space adjacent to the gate 8, extended from the middle portion of the shell 21. Around the nichrome wire 13 in the shell 21 is formed an air gap 23 into which a glass tube 24 is inserted. Around the glass tube 24 is formed a spiral groove 25 along in which, such a waste-heat conductive wire 26 as nichrome wire is coiled and supported firmly by means of baked ceramic clay 22 which is filled in the metal tubular shell 21. The leading wires 27, 28 respectively of the heat-generating wire 13 and of the waste-heat conductive wire 26 are led out of a passage at the bottom of the shell 21. The function and result of the heat-generating wire 13 in FIG. 3b is similar to those of FIG. 3a as well as the both structures of the embodiments therein, except the waste-heat conductive wire 26 included in the former. The waste-heat conductive wire 26 is useful for keeping up the temperature of the fused resin for resin for injection in the runner 10 to prevent the material from being solidified, so that any heat insulator is unnecessary to be provided, but only by making the diameter of metal tubular shell 21 smaller, the improvement of quality of the intermittent heater 11 is possible.

To operate the intermittent heater 11, for example, as shown in FIG. 4a, it is connected through the leading wire 27 with an electric circuit including a timer switch 31, consisting of an "on" timer 30a which is set by electric flow from a power source 29, and an "off" timer 30b which is switched after elapse of a desired time, and a security switch system 32, which is closed only when all the conditions being satisfied for the process of injection of synthetic resin, and a variable resistance 33 for controlling temperature.

Now, the operation of the embodiment will be explained referring to FIG. 4a, but all the conditions for the process of injection mold are esteemed to be satisfied, under which the security switch system 32 is closed to set the "on" timer 30a in connection with a movement of an injection molding process. The resin held in the runner 10 is kept being fused by means of a heating device (not shown in drawings) provided with the metal block 15, while some resin remained in the gate opening is solidified by being cooled to close the gate 8.

When the point 13 of the intermittent heater 11 is generated heat after a predetermined time, one second after, for example, by the "on" timer 30a, the gate opening will be heated for three seconds, for example, until the circuit is switched by the "off" timer 30b. When the cooled and solidified resin in the gate opening is fused, the gate 8 is opened, so that the fused resin in the runner 10 is injected by the injection system 2 into the mold cavity between the parts 5, 6 of the mold, to produce desired castings. Thus an injection mold process has finished, then another process will be repeated from the beginning.

In brief, every time of an injection molding process, the intermittent heater 11 is energized to heat the gate 8 for a determined time through a timer system 31 so that the gate may be opened and closed alternately employing an electric pulse current as shown in FIG. 4b of which consumption is so small that high efficiency and economical molding with high accuracy is possible. Further, as the intermittent heater 11 is actuated through the timer system 31, the injection molding process is carried out serially in conjunction with the opening and closing of the mold. To carry out higher efficiency in the process, it is possible to alter and select the energizing time ($t$) of the intermittent heater 11 to be heated, and the intermittent heater 11 to be heated, and the intermittent cycle ($T$) thereof, according to the kind of resin and size of products, etc. The embodiment of FIG. 4a is characterized by the above mentioned structure, operation and effect.

In a further embodiment, the shape of the intermittent heater 11 can be, needless to say, designed corresponding to the size and shape of the runner 10 so that the fused resin may be injected smoothly by an emission not only such a shape as shown, but also it may be formed so that temperature may be distributed in the heater system being fallen gradually toward the opposite portion of the heating point which has a heat-generating wire 13 to generate heat.

It may be understood that the design planning for distribution of waste-heat in the system is only a supplementary way for keeping the resin in the runner fused constantly by employing waste-heat to prevent it from being solidified by cooling, as well as the waste-heat conductive means for heat insulation in the metal block 15, if it may be provided, is for obtaining an additional effect, and further, the intermittent heater 11 may be formed without its base but only being introduced the thin heat-generating wire 13 into the gate opening 8 by a conventional way.

Still further, for operating the intermittent heater 11, such a bimetalic wire system or rotary system using a motor, may be employed as well as the above mentioned timer to carry out the same effect.

Now, still another embodiment of the present invention will be explained referring to FIGS. 5 and 6.

The structure of this embodiment is planned to produce a product with an even or flat surface finish without any ugly spot thereon caused by the gate opening, and this is very much important for molding.

As shown in the drawings, the gates 8 are formed in the female part 6 of the mold, the opening of which is conformed to that of each conical cap 17 provided in the rear of each gate 8 which communicates with a runner so that only a contour of the gate 8 having a single point may appear on the opening when it is seen from inside of the cavity of the female part 6, so the preferred effect on the products without forming bad spots, will be obtained.

The spots or marks to be left on the surfaces of products produced by the generally known method so called "Wasteless Method," are attributed to the large caliber of the gate.

In the structure, as shown in FIG. 3a, adoptable the "Wasteless Method" the relation between the diameter of the caliber (given D) and the length of the gate-land (= inside surface around the gate channel) (given L) is L<D, accordingly the caliber in the above mentioned structure has been impossible to make it smaller in a limited range, so that the marks have been apt to be left on the castings to produce only bad products.

As shown in FIG. 3b in the embodiment of the present invention, the gate-land (L) is improved to be extremely shortened without keeping the relation of L<D, and the caliber (D) also to be shortened in such a reverse relation as L>D, so that no marks left on the casting can be recognized, namely, the length of the gate-land (L) of the gate 8 to which is introduced the heat-generating wire 13 of the intermittent heater 11 as shown similarly in every Figures is shortened in such a relation as L>D, reversely in the relation of L<D which is not necessary any more in this embodiment.

The embodiments as shown in FIGS. 5 and 6 are provided with a plurality of gates respectively, the former being formed two cavities in a mold and the latter formed only a large cavity. In FIG. 5, the mold is consisted of two parts 5 and 6 are provided with two cavities of a similar form therebetween for producing two castings by an injection molding process, naturally more than two cavities are formable to produce several castings at one process and the shape of each cavity may be different. In FIG. 6, the mold consisted of two parts 5, 6 has a very large cavity therebetween, into which fused resin can be injected simultaneously through two or more than two gates 8 for molding such a large casting as a body of car, or telephone box, etc., in case of being impossible to supply fused resin with entire space of the cavity through only a gate by an injection process.

As above metioned, since the mold 7 having a large cavity or a plurality of cavities is provided with a plurality of gates 8 into each of which a pointed heat-generating wire 13 of the intermittent heater 11 is introduced to heat a part of resin solidified by cooling, the injection process is carried out smoothly as such, in case the cavity is large, a large amount of fused resin being supplied therewith, through a plurality of gates 8 simultaneously to mold, or in case the mold has a plurality of cavities 7, similarly a predetermined amount of fused resin is supplied therewith, through a plurality of gates 8 so as to produce many castings in a process. When having completed an injection molding process, the operation of the heat-generating wire 13 upon the gate opening is stopped, so that the gate opening is cooled rapidly owing to its narrow construction and blocked by solidified resin.

In brief, the injection molding process of fused resin in the present invention is carried out smoothly by fusing the resin in the gate 8 for opening the gate, by means of the intermittent heater 11 which is energized to heat for a determined time intermittently, so that the resin in the gate 8 is always solidified by being cooled except the time when to start an injection process, accordingly the fused resin held in the runner 10 will not leak out unnaturally and the intermittent heater 11 is enough to be energized to heat momentarily and intermittently so that the durability of which is excellent, and the consumption of energy is so small that the economical requirement will be satisfied.

Another merit of the present invention is that, because of the point of the intermittent heater 11 being introduced into the narrow gate 8 and of the passage of the resin having been improved narrower, the resin is forced to pass therethrough speedily by which the resin is kneaded to be of better quality under such a low pressure of injection as 430 kg/cm$^2$ which is one-third of such needed pressure in former apparatus as 800 to 1,300 kg/cm$^2$ — that is a remarkable improvement thereof, so that the energy to be wasted for the operation will be decreased and molding efficiency will be improved very much, because of the fused resin being supplied directly with the cavity without the loss of pressure which is caused by such a passage bent in a right angle provided with the runner in the well known apparatus, and of the resin solidified in the narrow gate 8 being entirely fused instantly by a directly contacted heater maintaining the highest heating efficiency, but not by conducted heat, while the fused resin in the gate 8 being solidified rapidly to block the gate completely. Still another merit of the present invention is that as the narrow gate 8 communicating with the metal mold cavity is solidified and blocked mostly perfectly by being cooled, except every time of injection molding process, the fused resin is prevented from flowing back to the runner in the metal block especially from forming sniveling of nylon or threading or other deformity of castings, and that the damage of the metal mold is completely eliminated, so reparing or exchange of the expensive mold will never be occurred by which it will be avoided getting the apparatus to rest, to cut into the production, so that the apparatus is available semi-permanently and able to produce a lot of castings of even quality in a high efficiencial process with the good results of operation of the intermittent heater, making possible to work automatically in entire process only by checking the machine to drive so as to lower down the cost to produce such products having high accuracy, without employing any experienced workers to do the finishing work of getting rid of fins or sniveling and threading of castings after molding. No damages of the mold caused by the inevitable high pressure given to the sprue waste in the gate by the fused resin to be injected will occur as the fins or sniveling and threading of castings cause the damages of the mold.

The present invention is characterized by the method and apparatus which comprise two features one of which is based on that of the injection molding process with high accuracy which is imporved so as not to form sprue waste, and the other of which is based on that of the speedy injection molding process with high efficiency so called "Wasteless Method" which is improved so as to avoid constantly heating. Other features and effcts of the present invention will be listed collectively as follows:

a. No Formation of Sprue Waste: It is unnecessary to re-use the waste scraps, so the cost for such machine and for labor is reduced and instead of the weight of material wasted, a big casting used a corresponding weight with the same can be mold by one shot of emission. The sprue waste in the gate is given such a big pressure by the fused resin that it causes damage of the gate of a mold which has been inevitable hitherto, but by eliminating the fault, the product efficiency by the present invention has increased very much.
 b. Shortened Cycle of Molding: The injection of fused resin into the cavity for molding is capable of carrying out under lower temperature and pressure, so that the time to cool the injected resin has shortened, accordingly the cycle of molding has become shorter.
 c. The Effects of Low Pressure Molding:
   1. Cost of down of the molding apparatus: Under low pressure, it is possible to mold a product having a larger projection area than before, by an apparatus of the same size, so calculating back to the project area it is possible to mold a product having the same size as above by an apparatus of smaller size, of which cost is low in proportion to the size of the product.
   2. Almost none damage of a mold cavity: Damage in the cavity, especially by a thin pin is prevented.
   3. Precision molding: As the gate is blocked firmly after injection, molding under low pressure is possible, so that remained stress in a cavity becomes smaller to settle the material.
 d. Scarce Damage on the Surface of Mold Parts: As the gate is blocked firmly by sprue waste, sniveling of material is eliminated, so that threading will never be interposed between the surfaces of the mold parts making the damage decrease thereof and formation of fins caused by the damage on the surfaces will be eliminated owing to the even surfaces of the parts.
 e. Elimination of After-Finish
 f. Easy Possibility of Automatic and Motormanless Operation
 g. Easy Control of Temperature: It has been necessary to control the balance of temperature between the gate and the cavity for keeping the gate open by means of a highly experienced operator, but in the present invention, the gate is selectively opened and blocked, so the entire balance of temperature is not necessary to control but only to control separately that it is easy to control and operate.
 h. Fine Finish of the Surface of Castings without Formation of Spot by the Gate: As the gate is arranged normally to the cavity for being opened by being heater partially, the finish of the surface of castings is excellent without forming spot caused by the gate opening, similarly to that of "Cold-Runner Method."
 i. Available Any Kind of Material: In the conventional injection molding apparatus adopted the method as the gate is constantly opened, such materials as nylon, poly-carbonate, poly-acetal and acryl, etc., have been impossible or difficult to use, but in the present invention, all of them can be employed, especially such materials as synthetic rubber of the kind having a high density of molecules.
 j. No Limitation of Gate-Arrangement: The fused material can be injected through any gate, such as a submarine gate (or tunnel gate) which is arranged at any position, if it is located capably of being supplied with the fused resin.
 k. Selectable Injection into Any of Cavities in a Mold:

One or some of cavities in a mold were damaged and bad castings were produced, the wrong gate or gates can be blocked easily by solidified resin, and in case the shape of cavities is different in a mold, only a necessary cavity can be injected by the material.
 l. Selectable Cycle of Molding: In the conventional method so called "Hot-Runner Method," a quick cycle has been necessary because of solidification of resin in the gate and if the cooling time were too long, after injection for the purpose of producing a precise casting, it has been impossible to mold. While in the present invention, a slow cycle is available for eliminating the above mentioned fault to select the time to open the gate.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. In an injection molding apparatus, a combination comprising a mold having a pair of mold parts defining a mold cavity; operating means connected to one of said mold parts for opening and closing the mold; a gate provided in one of said mold parts and communicating at one end with said cavity; passage means communicating with said gate at the other end thereof for injecting fused plastic material through said gate into the mold cavity; electrical heating means including a heating wire in the region of said gate for maintaining, when energized, the plastic in the gate in fused condition; cooling means in said mold part for cooling said gate in said one mold part and for cooling also the plastic material injected through said gate into said mold cavity so that the material in said gate will solidify when said heating means is not energized; and timer means connected to said electrical heating means for energizing and de-energizing said heating means in sequence with said mold operating means for deenergizing said heating means before the mold is opened so that the material in said gate will solidify and for energizing said heating means after reclosing of the mold so as to fuse the material in said gate thus permitting injection of fused materials through said gate into said mold cavity.

2. A combination as defined in claim 1, wherein said passage means comprises a runner having a portion axially aligned with said gate and wherein said heating means comprises a substantially cylindrical shell coaxially arranged in said portion of said runner and a heating wire extending through and with an end portion thereof beyond said shell.

3. A combination as defined in claim 2, wherein said shell tapers in the direction toward said gate.

4. A combination as defined in claim 1, wherein said gate is of cylindrical configuration, and wherein said heating wire has a transverse dimension considerably smaller than the diamter of said gate and extends with a portion thereof into said gate.

5. A combination as defined in claim 1, wherein said one mold part is provided with a plurality of gates, said passage means communicating with the other end of each of said gates, and one of said heating means being provided for each gate.

* * * * *